US011130640B2

(12) United States Patent
Del Fabro

(10) Patent No.: US 11,130,640 B2
(45) Date of Patent: Sep. 28, 2021

(54) APPARATUS AND METHOD FOR HANDLING BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

( * ) Notice: Subject to any disclaimer, the term of this patent is extended or adjusted under 35 U.S.C. 154(b) by 0 days.

(21) Appl. No.: 16/637,455

(22) PCT Filed: Aug. 9, 2018

(86) PCT No.: PCT/IT2018/050152
§ 371 (c)(1),
(2) Date: Feb. 7, 2020

(87) PCT Pub. No.: WO2019/030791
PCT Pub. Date: Feb. 14, 2019

(65) Prior Publication Data
US 2020/0247615 A1    Aug. 6, 2020

(30) Foreign Application Priority Data

Aug. 10, 2017 (IT) .................. 102017000093087

(51) Int. Cl.
*B65G 47/14* (2006.01)
*B21D 43/00* (2006.01)
(Continued)

(52) U.S. Cl.
CPC ........... *B65G 47/14* (2013.01); *B21D 43/006* (2013.01); *B21F 23/007* (2013.01); *B65G 17/36* (2013.01); *B65G 2201/0217* (2013.01)

(58) Field of Classification Search
CPC .............................. B65G 47/14; B65G 17/36; B65G 2201/0217; B65G 65/00; B65G 47/04; B21D 43/006; B21F 23/007; B21F 23/005
See application file for complete search history.

(56) References Cited

U.S. PATENT DOCUMENTS 3,045,846 A    7/1962 Clark
4,744,716 A    5/1988 Pasko et al.
(Continued)

FOREIGN PATENT DOCUMENTS

CN    105564897 A    5/2016
EP    1845040 A1    10/2007
(Continued)

OTHER PUBLICATIONS

Int'l Search Report and Written Opinion dated Jan. 2, 2019 in Int'l Application No. PCT/IT2018/050152.

*Primary Examiner* — Lynn E Schwenning
(74) *Attorney, Agent, or Firm* — Panitch Schwarze Belisario & Nadel LLP

(57) ABSTRACT

An apparatus for handling bars includes a store provided with one or more containing elements, with a respective bundle or group of bars positioned in each. A feed station is located downstream of the store and configured to transfer the bars to a destination station. A removal device of the bars is associated with the feed station and is configured to remove the bars from at least one containing element of the store and transfer them onto the feed station. Movement means of the store, suitable to take at least one of said containing elements into correspondence with the removal device, are also included.

5 Claims, 5 Drawing Sheets

(51) Int. Cl.
    *B21F 23/00*     (2006.01)
    *B65G 17/36*     (2006.01)

(56) References Cited

U.S. PATENT DOCUMENTS

| | | | |
|---|---|---|---|
| 4,820,101 A | 4/1989 | Fenn | |
| 9,586,762 B1 * | 3/2017 | Graf | B65G 47/088 |
| 10,625,332 B2 * | 4/2020 | Del Fabro | B65G 15/12 |
| 2017/0144846 A1 * | 5/2017 | Vielhaber | B65G 57/18 |

FOREIGN PATENT DOCUMENTS

| | | |
|---|---|---|
| EP | 2172287 A1 | 4/2010 |
| FR | 1319054 A | 2/1963 |
| FR | 2550372 A1 | 2/1985 |

* cited by examiner

APPARATUS AND METHOD FOR HANDLING BARS

CROSS-REFERENCE TO RELATED APPLICATIONS

This application is a Section 371 of International Application No. PCT/IT2018/050152, filed Aug. 9, 2018, which was published in the English language on Feb. 14, 2019, under International Publication No. WO 2019/030791 A1, which claims priority under 35 U.S.C. § 119(b) to Italian Application No. 102017000093087, filed Aug. 10, 2017, the disclosures of each of which are incorporated by reference herein in their entirety.

FIELD OF THE INVENTION

The present invention concerns an apparatus and a method for handling bars, in particular metal bars.

The term bars generally refers to oblong shaped products such as, for example, rods, reinforcement rods, round bars, square bars or suchlike. The bars can therefore be used, for example, in the construction field.

BACKGROUND OF THE INVENTION

In the field of feeding bars to end users, for example user machines, such as bending machines, stirrup-making machines, welding, or other types of machines, it is often necessary to supply bars, which are removed by bridge cranes or suchlike, from appropriate stores, such as cabinets or suchlike, often divided at least according to size, and disposed on a feed station which sends them to an end-use station or machine.

The bars must often be supplied to the end user also with different diameters, for example because first of all a first type of product with a first diameter has to be produced, and then a second type of product with a different diameter.

Normally the bars are supplied in bundles, so that a first bundle can be formed by bars having a first diameter, a second bundle can be formed by bars having a second diameter and so on. As we said, the bundles are removed on each occasion, for example by bridge cranes, from the stores and replaced on a machine which separates them and removes them for supply to a user machine located downstream.

The user machine located downstream of the feed station can be provided, for example, with a rollerway on which the preselected and separated bars move.

Once a determinate range of products has been completed, the bars remaining and scattered, for example, on a plane are again recomposed, and bound to form a new bundle which is removed by the bridge crane and replaced in the store.

Another bundle of bars is removed by the bridge crane, for example of a different type, which is transferred to the separation machine and then the cycle starts again as before.

The procedure for transferring the bars from the store to the work plane is therefore extremely complex and cumbersome, as it requires to use a bridge crane or suchlike which must be suitably guided and positioned on each occasion in order to remove the bars from the store in a suitable manner.

This operation also substantially lacks an appropriate automation, by means of which, for example, the bars can be removed automatically from the store.

Another problem of known handling apparatuses is also the step when the bars not used by the work plane are returned or restored to the store, for which it is again required to use the bridge crane or suchlike.

There is also the problem of safety for the operators, both during the movement of the bundles with the bridge crane, and also during the steps where the bundles are released on the work plane.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to provide an apparatus and a method for handling bars, in particular metal bars, which can overcome at least one of the disadvantages of the state of the art.

A device for removing metal bars is known from EP 1.845.040, which has a store defined by a plurality of containing bags, which is mobile horizontally to position a selected one of the bags in correspondence with a vertically mobile removal mean, said removal mean having, at its end, a magnet to grip the bars.

A tube loader is known from U.S. Pat. No. 3,045,846, having a slider mobile horizontally, and removal arms associated with a work plane. The removal aims are flat and rotate by about 45° around an axis of rotation disposed below the work plane, to remove the bars from the slider and lift it. Belts are mounted on the removal anus, and can be tensioned to change their shape from a concave shape to a substantially flat shape and vice versa, in order to discharge the bars removed from the slider onto the work plane.

One purpose of the present invention is therefore to provide an apparatus for handling bars by means of which the bars can at least be automatically removed from a store, in which they are preferably disposed in one or more bundles, and are positioned on a feed station on which, preferably, they are suitably scattered or separated, and then sent to a destination station, such as a user machine or a processing machine, for example, but not restrictively, a bending machine, a curving machine, a stirrup-making machine or a welding machine.

Another purpose of the present invention is to provide an apparatus for handling bars by means of which, possibly, the bars scattered and unused in the feed station can be automatically returned to the store.

Another purpose of the present invention is to provide an apparatus for handling bars, in particular metal bars, which advantageously eliminates or at least limits manual operations and automates the process of removing and selecting the bars for their subsequent transfer to a destination station.

Another purpose of the present invention is to provide an apparatus for handling bars, in particular metal bars, which is also able to guarantee the integrity of the bars throughout the removal and transfer process.

Another purpose of the present invention is to perfect an effective and automated method for handling bars, in particular metal bars.

Another and not least purpose is to improve the safety conditions for the operators during all the removal, unloading and recovery steps of the bars.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes and according to a first aspect of the invention, an apparatus for handling bars comprises:

- a store provided with one or more containing elements in each of which a respective bundle or group of bars is positioned;
- a feed station, located downstream of said store, having a work plane and configured to transfer the bars to a destination station;
- a removal device of the bars associated with the feed station and configured to remove the bars from at least one containing element of the store and to transfer them onto the work plane of the feed station; and
- movement means of the store suitable to take at least one of the containing elements into correspondence with the removal device.

The removal device is provided with rotatable arms configured to collect the bars from a determinate containing element and to tip them onto the feed station.

The arms are shaped so as to define a concavity suitable to receive and contain at least the bars of a determinate bundle or group of bars.

The arms of the removal device can be reciprocally distanced and located on a rotation shaft connected to corresponding drive means, wherein the rotation shaft is associated and substantially aligned with the work plane of the feed station.

The arms of the removal device can be aligned in a longitudinal direction, substantially coplanar to an edge of the feed station opposite the destination station, along which the rotation shaft is directed.

The removal device can be disposed in correspondence with the edge of the feed station, so as to be able to both remove and unload the bars on the work station and receive possible bars not sent to the destination station and possibly return them to the store.

The store can be disposed on a guide inclined from the top downward, toward the feed station.

Alternatively, the store can comprise a support plane on which the containing elements are disposed and is associable with a movement device able to engage, on each occasion, with at least one of the containing elements and to take it toward the removal device.

The invention also concerns a method for handling bars, comprising at least a step of positioning on a store one or more bundles or groups of bars located in corresponding containing elements, at least a step of positioning at least one of the containing elements in correspondence with a removal device of the bars from the containing elements, at least a step of taking the bars from the containing element located in correspondence with the removal device, and transferring them toward a feed station suitable to send at least some of the bars removed toward a destination station.

The method can comprise at least a step of re-delivering, to the containing element, the bars tipped onto the feed station but not transferred to the destination station.

These and other aspects, characteristics and advantages of the present disclosure will be better understood with reference to the following description, drawings and attached claims. The drawings, which are integral with and form part of the present description, show some embodiments of the present invention, and together with the description, are intended to describe the principles of the disclosure.

The various aspects and characteristics described in the present description can be applied individually where possible. These individual aspects, for example aspects and characteristics present in the description or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
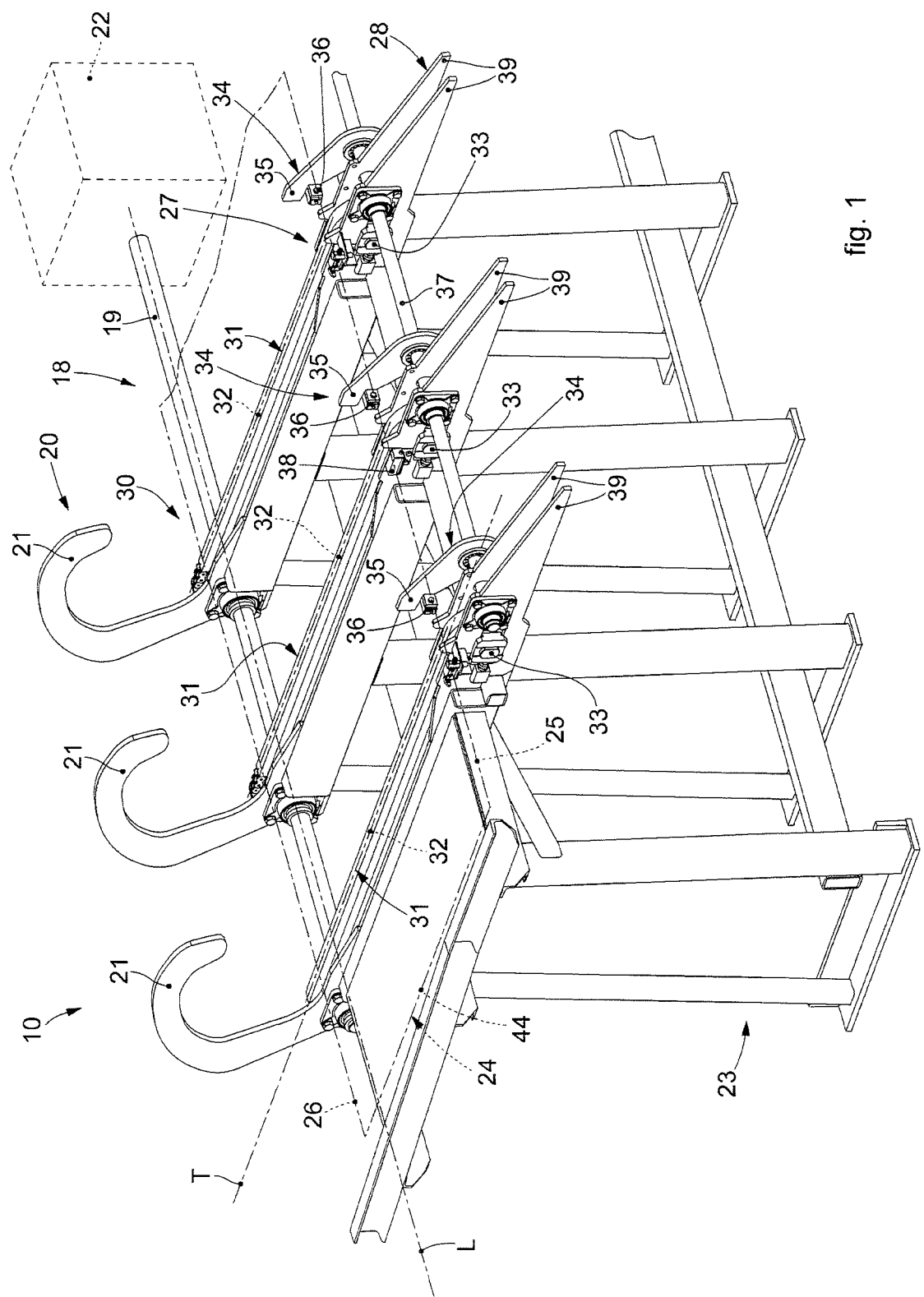
FIG. 1 is a three-dimensional view of a part of an apparatus for handling bars, in particular metal bars, according to the invention.
Figure 2:
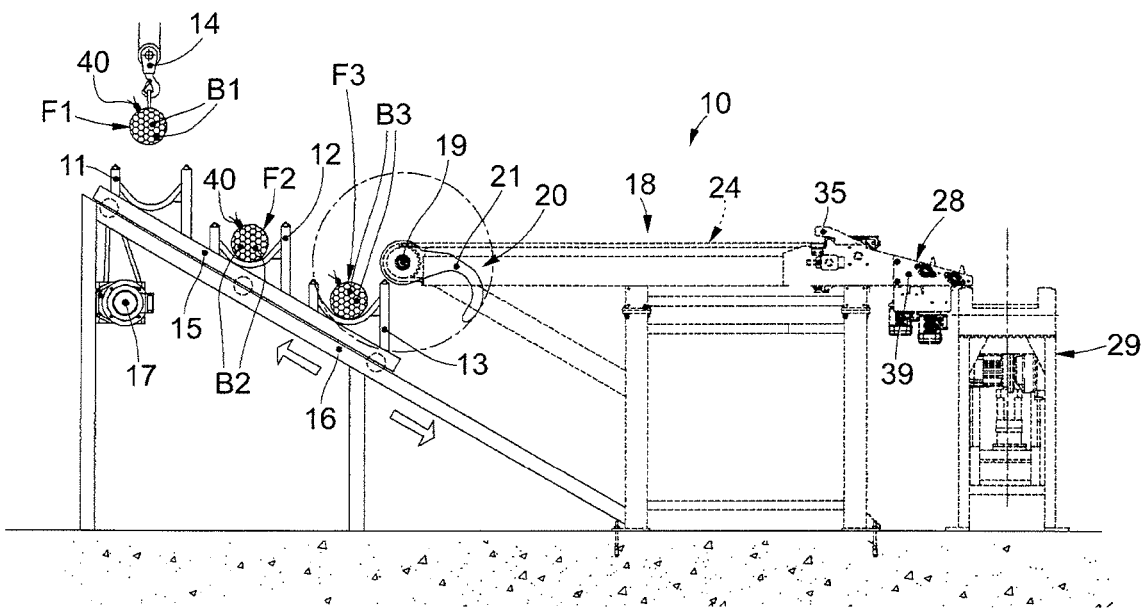
FIGS. 2 to 8 are views in lateral elevation of some operating steps of the present apparatus for handling bars.

With reference to the attached drawings, see, for example, FIGS. 1 and 2, an apparatus 10 for handling bars B1, B2, B3 according to the present invention comprises one or more containing elements 11, 12 and 13 in which at least one group or bundle F1, F2, F3 of bars B1, B2, B3 can be positioned.

For example, it is possible to hypothesize, by way of non-restrictive example, that the bars B1 of the bundle F1 have a first diameter, the bars B2 of the second bundle F2 have a second diameter and the bars B3 of the bundle F3 have a third diameter, wherein said first, second and third diameters are, for example, different from each other.

Each bundle F1, F2, F3 of bars B1, B2, B3 can be positioned in the respective containing element 11, 12 or 13 by means of a bridge crane 14, a crane or other.

The containing elements 11, 12 and 13 are positioned on a store 15, for example in the form of a cabinet or suchlike.

The containing elements 11, 12, 13 can also be shaped so as to provide a surface to house the bars B1, B2, B3, having an arched or concave shape, as shown by way of example.

The store 15 is mobile and can be made in the form of a slider able to slide along suitable guides 16 and translated, in one direction or the other, along the guides 16 by suitable drive means 17.

The guides 16 can be inclined so as to have a greater height in correspondence with the zone where the bundles F1, F2, F3 are loaded and progressively decreasing as it approaches a feed station 18 of the bars B1, B2, B3.

The feed station 18 substantially has the purpose of scattering and separating the bars B1, B2, B3 which are removed from the containing elements 11, 12, 13 by means of a removal device 20, associated with the feed station 18.

In particular, the removal device 20 is associated with an edge 26 of a work plane 24 of the feed station 18, facing toward the store 15, which is opposite to an edge 25 facing toward a destination station 29 to which the bars have to be transferred.

The removal device 20 comprises a rotation shaft 19 to which gripping or removal means of the bars B1, B2, B3 are connected, for example rotatable arms 21 suitable to collect and contain the bars B1, B2, B3.

The rotation shaft 19 is preferably directed in a longitudinal lying direction L of the bars B1, B2, B3 on the containing elements 11, 12, 13 and can be made to rotate, in one direction or the other, by suitable drive means 22, for example a suitably commanded electric motor or other.

The rotation shaft 19 is substantially aligned and coplanar with the edge 26 of the work plane 24 of the feed station 18.

The arms 21 are integral with the rotation shaft 19 and, preferably, the removal device 20 comprises at least two reciprocally distanced rotatable arms 21 and positioned so as to remove the bars B1, B2, B3 efficiently and stably.

The example shows, by way of non-restrictive example, three rotatable arms 21 suitably distanced along the rotation shaft 19.

Moreover, the rotatable arms 21 are preferably positioned at the same height, so that the bars B1, B2, B3 are stably positioned thereon.

Furthermore, the rotatable arms 21 are shaped so as to define a concavity suitable to receive and contain at least the bars B1, B2 or B3 of a given bundle F1, F2 or F3 or group of bars B1, B2, B3. The arms 21 can therefore have the shape of an arc of a circle, or suchlike.

The rotatable arms 21, however, could be replaced by other gripping or removal means, which could have different operating principles, for example magnetic removal means, and/or could be conformed and shaped differently from what is shown here.

The bars B1, B2, B3 are removed, as we said and in the manner described below, from the containing elements 11, 12, 13 of the store 15 by means of the removal device 20.

Each of the containing elements 11, 12 or 13 can be formed by a plurality of arms alternately adjacent in the longitudinal lying direction L of the bars B1, B2, B3, for example similar to the disposition of the rotatable arms 21 of the removal device 20 but offset with respect to them, so that the rotatable arms 21 of the removal device 20, when they are lowered by rotation, can remove the bars B from the containing elements 11, 12, and 13 and take them to the feed station 18.

The feed station 18 comprises a frame 23 on which the work plane 24 is defined.

The work plane 24 is provided with the first edge 25 and the second edge 26 opposite and directed in the longitudinal direction L, and with two transverse edges 44, only one of which is visible in FIG. 1, interposed between the first edge 25 and the second edge 26.

The work plane 24 can be positioned horizontally to prevent bars the B1, B2, B3 from moving, due to gravity, in an unwanted manner.

The first edge 25 and the second edge 26 preferably have a length substantially equal to, or greater than, the length of the bars B1, B2, B3 to be worked.

The bars B1, B2, B3, in fact, are loaded on the work plane 24 substantially parallel to the first edge 25 and to the second edge 26.

On the work plane 24 an exit zone 27 can be identified in correspondence with which the bars B1, B2, B3 are removed, as described hereafter, to be transferred to a delivery zone 28, located downstream of the work plane 24.

From the delivery zone 28, the bars B1, B2, B3 can pass to the destination station 29, for example a rollerway, or other.

According to a possible solution, the exit zone 27 is positioned in correspondence with the first edge 25 of the work plane 24.

In proximity to the second edge 26 of the work plane 24 a zone 30 to remove and possibly return the bars B can thus be identified.

Movement devices 31 can be associated with the work plane 24 and are configured to distribute the bars B1, B2, B3 uniformly on the work plane 24 and to move them toward the exit zone 27.

The movement devices 31 are positioned on the work plane 24 distanced from each other and each of them acts on a portion of the bars B1, B2, B3 to determine the movement of each of the bars B1, B2, B3.

In particular, as we will see, the bars B1, B2, B3, which are initially collected in the bundles F1, F2 and F3, can be unloaded onto the work plane 24 and, thanks to the presence of the movement devices 31, can be uniformly distributed on the latter, preventing them from overlapping, or reciprocal twisting, which would compromise the subsequent removal of a bar B1, B2, B3 from the exit zone 27.

Each movement device 31 can have an oblong development in a transverse direction T, advantageously orthogonal to the longitudinal direction L and therefore to the edges 25 and 26 of the work plane 24.

In particular, it can be provided that each movement device 31 has a first end located in correspondence with the first edge 25 and a second end located in correspondence with the second edge 26.

In this way the movement devices 31 are able to receive and move all the bars B1, B2, B3 disposed on the work plane 24.

In accordance with possible embodiments of the present invention, each movement device 31 comprises a transmission member 32 which can be selectively moved in a closed ring around return members 33.

The upper surface of each of the transmission members 32 can define the work plane 24 on which the bars B1, B2, B3 are positioned.

The transmission members 32 can be chosen from a group comprising at least one of either a chain, a belt or a cable.

The return members 33, possibly motorized, can comprise at least one of either wheels, pulleys or toothed crowns, suitable to allow the transmission member 32 to wind around them.

The movement devices 31 can be associated with the same rotation shaft 19 which drives the rotatable arms 21 of the removal device 20 and can be suitably synchronized with the removal device 20.

The feed station 18 comprises handling devices 34 configured to remove, on each occasion, a bar B1, B2, B3 from the exit zone 27 of the work plane 24 and transfer it to the delivery zone 28.

The handling devices 34 can be reciprocally distanced in the longitudinal direction L.

In this way, the handling devices 34 each act on a predefined longitudinal portion of the bar B1, B2, B3 supporting the latter along its entire length, and preventing oscillations of the bar B1, B2, B3 due to its own weight.

The handling devices 34 comprise a plurality of transfer arms 35 provided with magnetic retaining elements 36 configured to magnetically retain one of the bars B1, B2, B3 during its transfer between the exit zone 27 and the delivery zone 28.

The transfer arms 35 are alternately mobile between the exit zone 27 and the delivery zone 28, and vice versa.

The transfer arms 35 can be installed on a common rotation shaft 37 which is selectively rotatable to simultaneously take the transfer arms 35 from the exit zone 27 to the delivery zone 28, or vice versa.

The rotation shaft 37 will be connected to an actuation member configured to make the rotation shaft 37 rotate around its axis, and, with it, the transfer arms 35.

The rotation shaft 37 allows to synchronize the movement of all the transfer anus 35 by moving the bar B1, B2, B3 uniformly and without causing deformation.

The rotation shaft 37 can be installed adjacent and parallel to the oblong development of the first edge 25, and extends substantially over the entire length of the latter.

In the exit zone 27, the work plane 24 is provided with at least one retaining magnetic body 38 configured to retain at least one of the bars B1, B2, B3, adherent to the work plane 24.

As can be seen from the drawings, the delivery zone 28 is inclined with respect to the work plane 24 on which the exit zone 27 is defined.

In this way, when the metal bar B1, B2, B3 delivered to the delivery zone 28, it is unloaded, by gravity, toward the destination station 29.

The delivery zone 28 can comprise a plurality of support brackets 39 distanced from each other along the longitudinal development of the first edge 25.

Each support bracket 39 can be configured with an inclined plane and be provided with a support surface suitable to support a portion of the bar B1, B2, B3.

The support brackets 39 extend, in the case shown here, substantially parallel to the transverse direction T.

With reference to FIGS. 2-8, a possible operating sequence of the present apparatus 10 for handling bars B1, B2, B3 is described.

In a first functioning step, the store 15, thanks to its sliding on the guides 16, is taken into a position suitable to allow the bundles F1, F2, F3 of bars B1, B2, B3 to be loaded into the containing elements 11, 12, 13, see FIG. 2.

The bars B1, B2, B3 which form the bundles F1, F2 F3 are grouped by ligatures 40 or suchlike, see for example bundle F1.

The bundles F1, F2 and F3 are then disposed by means of the bridge crane 14, or other, in the corresponding containing element 11, 12, 13.

Figure 3:
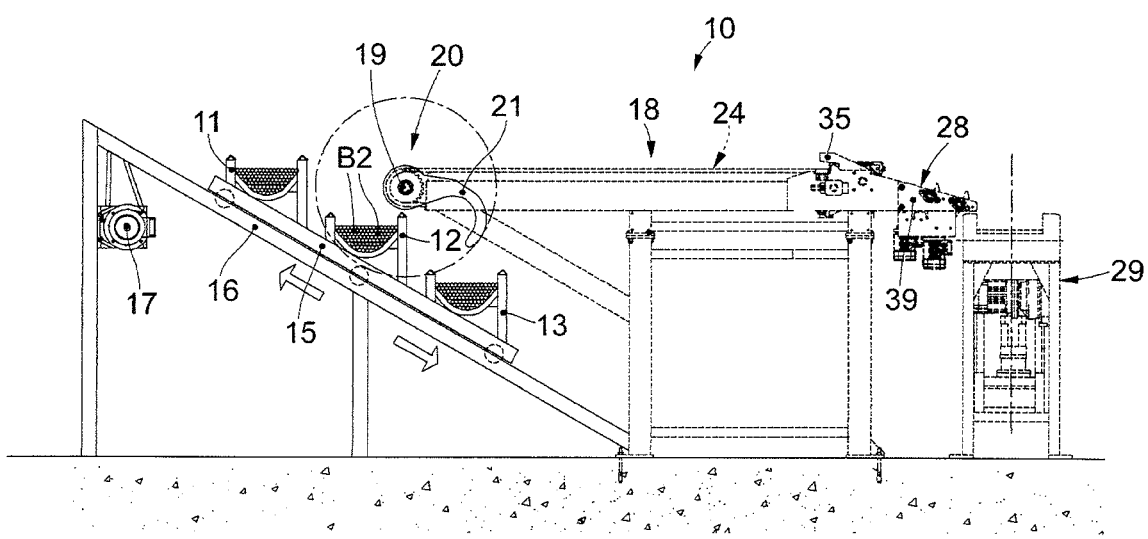

In a subsequent step, the ligatures 40 are removed and the bars B1, B2, B3 will be disposed in the containing elements 11, 12, 13 for example as shown in FIG. 3.

The store 15, moreover, can be translated toward the feed station 18 so that one of the containing elements, for example containing element 12, moves into proximity with the removal device 20, again see FIG. 3.

The removal device 20 is made to function so that the rotatable arms 21 are rotated by the rotation shaft 19, commanded by the corresponding drive means 22.

Figure 4:
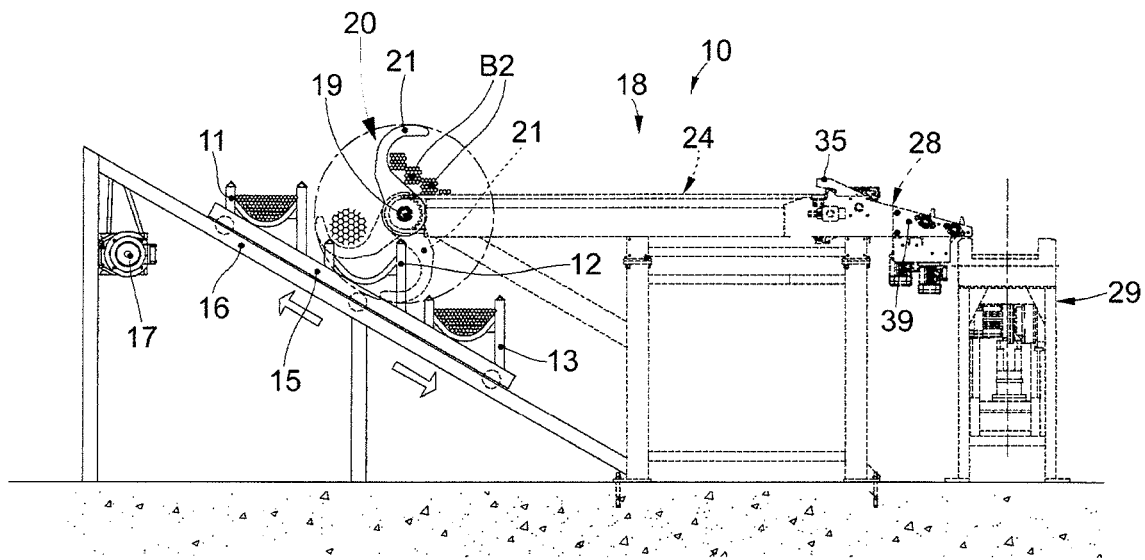
Figure 5:
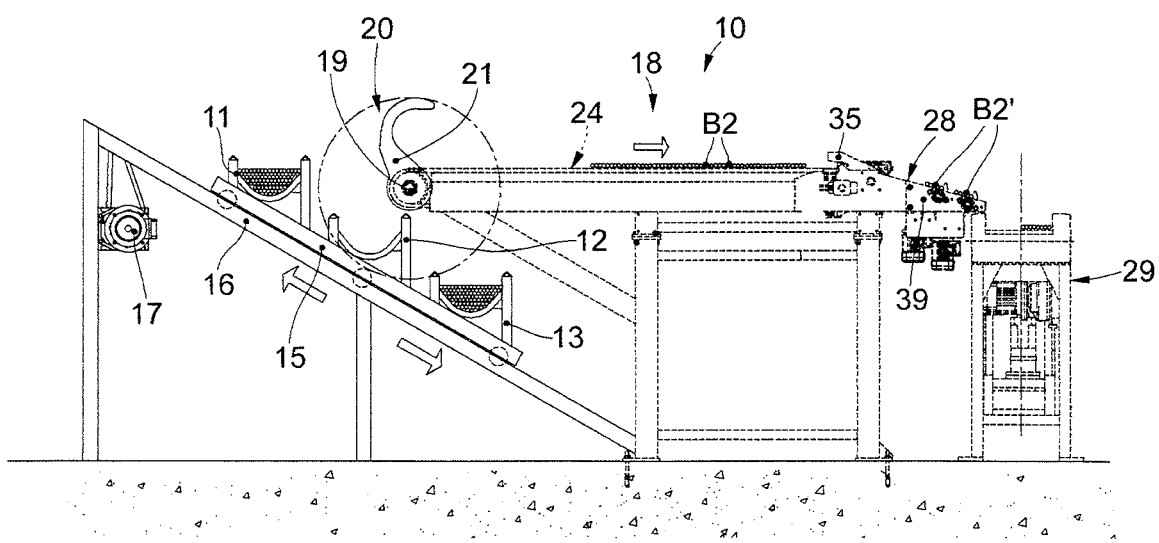

The rotatable arms 21 are driven so as to remove the bars B2 from the containing element 12, lift them up and lay them above the work plane 24 of the feed station 18, see FIG. 4.

The rotatable arms 21 rotate by more than 90°, up to 180° and more; thanks to their concave shape and to the fact that their axis of rotation, defined by the rotation shaft 19, is located at the level of the edge 26 of the work plane 24, they can perform the entire operation of removing the bars and unloading them onto the work plane 24, without needing other operations or other associated devices, as seen from the sequence in FIGS. 4-8.

The rotatable arms 21, therefore, in the situation where the bars B2 are removed, are substantially below the work plane 24, whereas, in the situation where the bars B2 are released onto the feed station 18, they are above the work plane 24.

In the feed station 18, the bars B2 are scattered and separated, thanks to the use of the movement devices 31, until a layer of bars B2 aligned in direction L is obtained. The bars B2 will be disposed for example as in FIG. 5.

The bars B2 are taken by the movement devices 31 toward the exit zone 27 and then toward the delivery zone 28, from which they will pass to the destination station 29.

Figure 6:
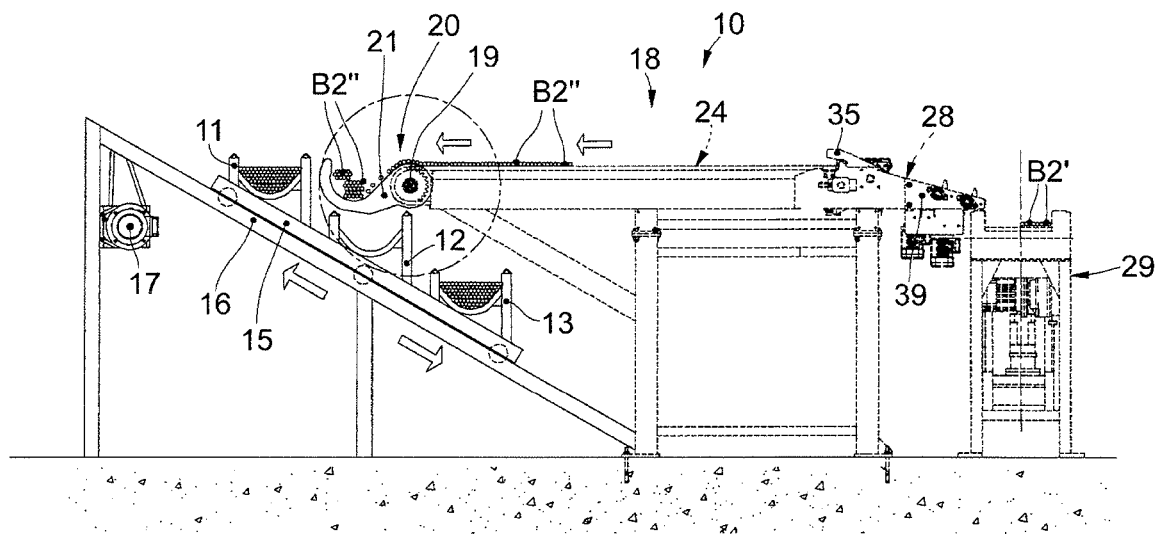
Figure 7:
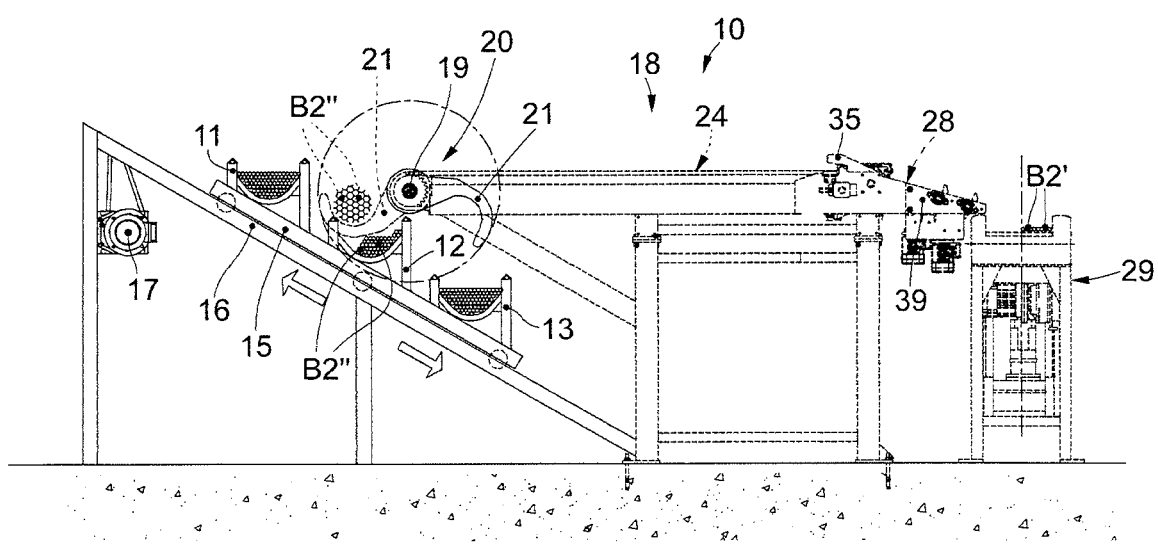

By means of a suitable control unit of the present apparatus 10, not shown in the drawings, it is possible to provide that, with respect to the bars B2 originally present in the bundle F2 of the containing element 12 and removed by the removal device 20, a certain number of bars B2' are transferred to the destination station 29, while a number of bars B2" not used, are transferred again to the removal device 20, see for example FIG. 6.

The rotatable arms 21 are rotated again so that the bars B2" are again located in the containing element 12, which is at least partly filled again.

Naturally, it is possible to provide that all the bars B2 go to the destination station 29, therefore, in this case, a step to redeliver the bars to the containing element would not be provided.

Figure 8:
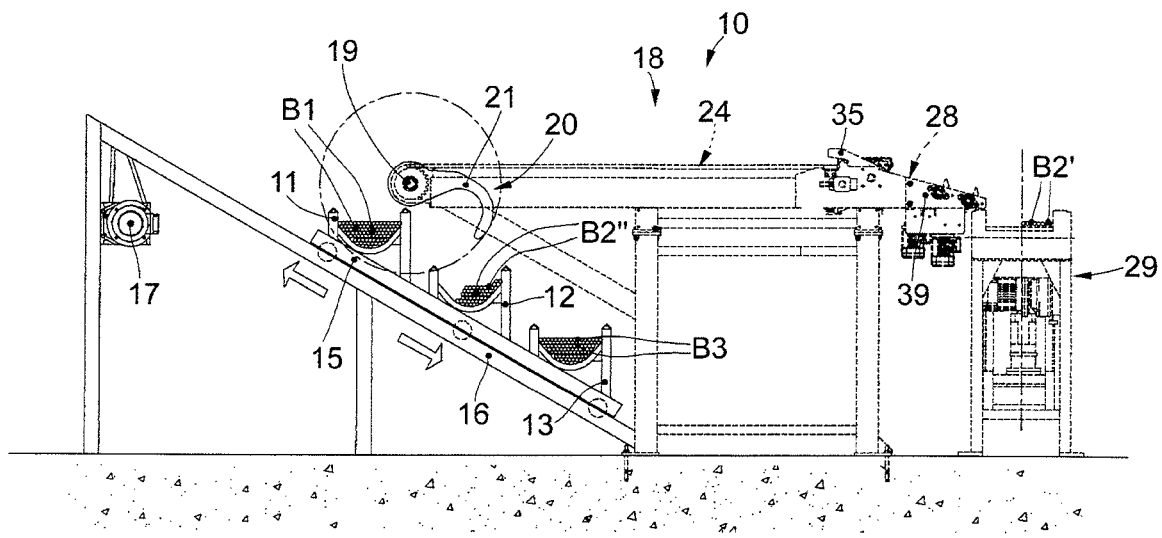

Assuming that it is also necessary to provide other bars of different diameters, for example bars B1, to the destination station 29, the store 15 can be translated along the guides 16 so that the containing element 11 moves in correspondence with the removal device 20, as shown for example in FIG. 8.

The removal device 20 will proceed with the removal of the bars B1, by rotating the rotatable arms 21, in a manner similar to that described in relation to the bars B2 of the containing element 12, therefore the bars B1 can be tipped into and separated in the feed station 18, and then pass, in the desired number, to the destination station 29.

As can be understood, advantageously, the operations to remove and possibly return the bars can be repeated in various ways so as to provide the end user with groups of bars or single bars having different diameters, in a quick, efficient and automated manner.

Figure 9:
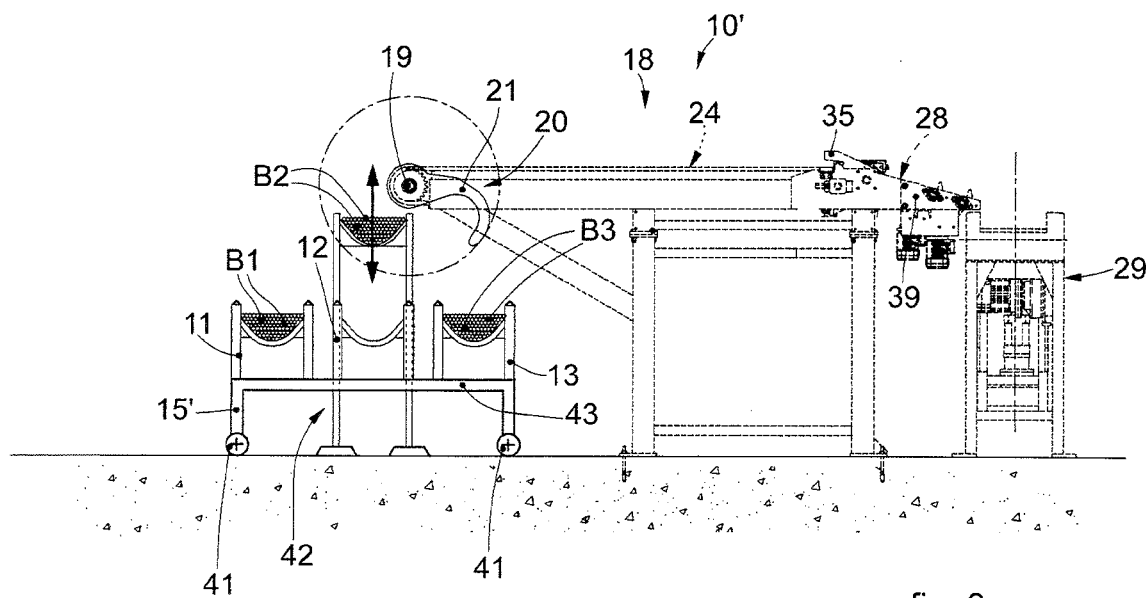
FIG. 9 is a variant of the present apparatus for handling bars.

FIG. 9 shows a variant of the store 15', in which the store 15' is provided with wheels 41, or suchlike, and can be translated so as to position one of the containing elements 11, 12, 13 in proximity to the removal device 20.

The store 15' comprises at least one plane 43 where the containing elements 11, 12, 13 are rested, so that they can possibly be raised with respect to the plane 43.

Preferably, in correspondence with the removal device 20, a movement device 42 is provided, suitable to engage with the selected containing element, for example the containing element 12, and to lift it to a suitable height to allow the removal of the bars B2 by rotating the rotatable arms 21, as described previously.

In this variant, therefore, the store 15' moves horizontally and in any case with the containing elements 11, 12, 13 situated at a height not suitable to interact with the removal device 20, for this the movement device 42 is provided, in this case a lifting device.

The movement device 42 is preferably fixed and can comprise hydraulic, pneumatic or other pistons, suitable to cooperate, on each occasion, with the selected containing element and to take it substantially into correspondence with the rotatable arms 21 of the removal device 20, thus in a position suitable for removing or returning the bars.

It is clear that modifications and/or additions of parts can be made to the apparatus and method for handling bars as described heretofore, without departing from the field and scope of the present invention.

It is also clear that, although the present invention has been described with reference to some specific examples, a person of skill in the art shall certainly be able to achieve many other equivalent forms of apparatus and method for handling bars, in particular metal bars, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An apparatus for handling bars, comprising:
 a store (15, 15') provided with at least one containing element (11, 12, 13);
 a bundle (F1, F2, F3) of the bars (B1, B2, B3) positionable in the at least one containing element (11, 12, 13);
 a feed station (18) located downstream of said store (15, 15'), having a work plane (24) and configured to transfer the bars (B1, B2, B3) from the at least one containing element (11, 12, 13) to a destination station (29), the work plane (24) having a first edge (25) facing toward the destination station (29) and a second edge (26) facing toward said store (15, 15');
 a removal device (20) associated with the feed station (18) and configured to remove the bars (B1, B2, B3) from the at least one containing element (11, 12, 13) and to transfer the bars (B1, B2, B3) onto the feed station (18); and
 a movement means (16, 17, 41) of the store (15, 15') suitable to take the at least one containing element (11, 12, 13) into correspondence with said removal device (20),
 wherein said removal device (20) comprises rotatable arms (21) with a concave shape rotatable around an axis of rotation defined by a rotation shaft (19) substantially aligned and coplanar with said second edge (26) of the work plane (24) of the feed station (18), and said store (15) is disposed on a guide (16) inclined downwardly toward said feed station (18).

2. The apparatus of claim 1, wherein movement devices (31) are associated with the work plane (24) and are configured to distribute and separate the bars (B1, B2, B3) on the work plane (24) and move them toward the destination station (29).

3. The apparatus of claim 2, wherein each movement device (31) comprises a transmission member (32) selectively mobile in a closed ring around return members (33).

4. A method for handling bars, comprising the steps of:
 positioning on a store (15, 15') at least one bundle (F1, F2, F3) of bars (B1, B2, B3) located in at least one containing element (11, 12, 13), said store (15) disposed on a guide (16) inclined downwardly toward a feed station (18);
 positioning the at least one containing element (11, 12, 13) in correspondence with a removal device (20) of the bars (B1, B2, B3);
 taking the bars (B1, B2, B3) located in correspondence with the removal device (20), and transferring the bars (B1, B2, B3) toward the feed station (18), wherein the feed station has a work plane (24) and is suitable to send at least some of the bars (B1, B2, B3) removed toward a destination station (29),
 wherein said removal and transfer step of the bars (B1, B2, B3) is carried out by means of a rotation of up to 180° of arms (21) with a concave shape rotatable around an axis of rotation defined by a rotation shaft (19) substantially aligned and coplanar with an edge (26) of said work plane (24) of the feed station (18).

5. The method of claim 4, further comprising a step of re-delivering, to the containing element (12), the bars (B2") tipped onto the feed station (18) but not transferred to the destination station (29).

* * * * *